United States Patent [19]

Chang et al.

[11] Patent Number: 5,061,466
[45] Date of Patent: Oct. 29, 1991

[54] SYNTHESIS OF LARGE PORE ZEOLITES CONTAINING GALLIUM

[75] Inventors: Clarence D. Chang, Princeton; Cynthia T. Chu, Pennington, both of N.J.; Thomas F. Degnan, Jr., Yardley; Sharon B. McCullen, Newtown, both of Pa.

[73] Assignee: Mobil Oil Corporation, Fairfax, Va.

[21] Appl. No.: 120,891

[22] Filed: Nov. 16, 1987

[51] Int. Cl.$^5$ .................. C01B 35/12; C01B 33/34
[52] U.S. Cl. .................. 423/277; 423/328
[58] Field of Search .............. 423/118, 277, 326, 328, 423/329, 624; 502/61, 84

[56] References Cited

U.S. PATENT DOCUMENTS

| | | | |
|---|---|---|---|
| Re. 28,341 | 2/1975 | Wadlinger et al. | 423/329 |
| 3,308,069 | 3/1967 | Wadlinger et al. | 423/329 |
| 4,180,689 | 12/1979 | Davies et al. | 585/407 |
| 4,245,130 | 1/1981 | Jones et al. | 585/481 |
| 4,304,686 | 12/1981 | Telford | 502/61 |
| 4,377,504 | 3/1983 | Roberts et al. | 502/61 |
| 4,487,843 | 12/1984 | Telford et al. | 502/61 |
| 4,490,569 | 12/1984 | Chu et al. | 585/415 |
| 4,520,118 | 5/1985 | Gane et al. | 502/61 |
| 4,524,140 | 6/1985 | Chang et al. | 502/61 |
| 4,629,818 | 12/1986 | Burress | 585/517 |
| 4,642,226 | 2/1987 | Calvert et al. | 423/329 |
| 4,701,313 | 10/1987 | Chang et al. | 423/329 |

FOREIGN PATENT DOCUMENTS

| | | | |
|---|---|---|---|
| 0055046 | 6/1982 | European Pat. Off. | 423/328 |
| 169026 | 7/1985 | European Pat. Off. | |
| 0184927 | 6/1986 | European Pat. Off. | 502/61 |
| 0258726 | 3/1988 | European Pat. Off. | |

OTHER PUBLICATIONS

Ser. No. 136,215 filed Dec. 18, 1987.
Ser. No. 882,875 filed Jul. 7, 1987.
Ser. No. 882,863 filed Jul. 7, 1986.
Anderson, "Calculation of Research Octane . . . " *Journal of the Institute of Petroleum*, vol. 58, No. 560 (1972).
Journal of Catalysis, 106, pp. 287–291 (1987).
Taramasso, "Molecular Sieve Borosilicates", pp. 40–48.
Zulfugarov, "Synthesis of Gallosilicate and Alumogermanate Zeolites . . . " Structure and Reactivity of Modified Zeolites, pp. 167–174 (1984).
D. W. Breck, Zeolite Molecular Sieves, John Wiley & Sons, pp. 321–322.
Atlas of Zeolite Structure Types, by W. M. Meier and D. H. Olson, Second Revised Edition, 1987, Published on behalf of the Structure Commission of the International Zeolite Association.

*Primary Examiner*—R. Bruce Breneman
*Attorney, Agent, or Firm*—Alexander J. McKillop; Charles J. Speciale; Marina V. Schneller

[57] ABSTRACT

The invention is directed to increasing the cracking activity and providing aromatization activity to a large pore zeolite by incorporating gallium into the framework of a large pore zeolite.

5 Claims, No Drawings

SYNTHESIS OF LARGE PORE ZEOLITES CONTAINING GALLIUM

FIELD OF THE INVENTION

This invention is directed to gallium containing large pore zeolites, having characteristic X-ray powder diffraction patterns, to their synthesis and to their use as catalysts. These compositions show excellent cracking activity and high aromatic selectivity.

BACKGROUND OF THE INVENTION

Naturally occurring and synthetic zeolites have been demonstrated to exhibit catalytic properties for various types of hydrocarbon conversions. Certain zeolites are ordered porous crystalline aluminosilicates having definite crystalline structure as determined by X-ray diffraction studies. Such zeolites have pores of uniform size which are uniquely determined by structure of the crystal. The zeolites are referred to as "molecular sieves" because the uniform pore size of a zeolite material may allow it to selectively adsorb molecules of certain dimensions and shapes.

By way of background, one authority has described the zeolites structurally, as "framework" aluminosilicates which are based on an infinitely extending three-dimensional network of $AlO_4$ and $SiO_4$ tetrahedra linked to each other by sharing all of the oxygen atoms. Furthermore, the same authority indicates that zeolites may be represented by the empirical formula

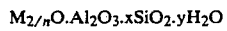

$M_{2/n}O.Al_2O_3.xSiO_2.yH_2O$

In the empirical formula, x is equal to or greater than 2, since $AlO_4$ tetrahedra are joined only to $SiO_4$ tetrahedra, and n is the valence of the cation designated D. M. Breck, ZEOLITE MOLECULAR SIEVES, John Wiley & Sons, New York p. 5 (1974). In the empirical formula, the ratio of the total of silicon and aluminum atoms to oxygen atoms is 1:2. M was described therein to be sodium, potassium, magnesium, calcium, strontium and/or barium, which complete the electrovalence makeup of the empirical formula.

The prior art describes a variety of synthetic zeolites. These zeolites have come to be designated by letter or other convenient symbols, as illustrated by the zeolite. The silicon/aluminum atomic ratio of a given zeolite is often variable. Moreover, in some zeolites, the upper limit of the silicon/aluminum atomic ratio is unbounded. ZSM-5 is one such example wherein the silicon/aluminum atomic ratio is at least 2.5 and up to infinity. U.S. Pat. No. 3,941,871, reissued as U.S. Pat. No. Re 29,948, discloses a porous crystalline silicate made from a reaction mixture containing no deliberately added aluminum and exhibiting the X-ray diffraction pattern characteristic of ZSM-5.

Various patents describe inclusion of elements other than silicon and aluminum in the preparation of zeolites. Cf. U.S. Pat. No. 3,530,064, U.S. Pat. Nos. 4,208,305 and 4,238,318 describe the preparation of silicates in the presence of iron. ZSM-5 is a member of a class of zeolites sometimes referred as medium pore zeolites. The pore sizes of medium pore zeolites range from about 5 to about 7 Angstroms.

Another class of zeolites sometimes referred to as large pore zeolites include inter alia naturally occurring faujasite, synthetic zeolites X, L, Y, and zeolite beta. These zeolites are characterized by pore sizes greater than those of the medium pore zeolites. The pore sizes of large pore zeolites are greater than about 7 Angstroms. Because of the larger pore sizes these latter zeolites may be less (molecule) shape selective. Zeolite beta is the subject of U.S. Pat. No. 3,308,069 and U.S. Pat. No. Re 28,341, each of which describes the X-ray diffraction of zeolite beta, which is incorporated by reference herein. Like ZSM-5, zeolite beta has been reported to have been made with various framework elements. Cf. M. Taramasso et al., "Molecular Sieve Borosilicates," Proceedings of the Fifth International Conference on Zeolites, Heyden & Son Ltd. 40–48 (1980), and copending application Ser. No. 836,210 filed Feb. 28, 1986, each of which is relied upon and incorporated by reference herein.

SUMMARY OF THE INVENTION

A gallium modified large pore zeolite is prepared by treatment of a zeolite sample with a source of Ga in aqueous solution at reflux or lower temperatures. The gallium may be incorporated as part of the framework of zeolite, or by exchange, or by impregnation on the zeolite. The zeolite can be a boron containing zeolite.

The preparation of gallium modified large pore zeolite by this method produces a catalyst with higher cracking activity and higher aromatic selectivity. The aromatic products which can be produced from aliphatic feeds include benzene; ethyl benzene; o-, m- and p-xylenes(s), toluene, and the $C_{10}{}^+$ aromatics. The $C_{10}{}^+$ aromatics significantly increase the motor octane number, compared to the $C_8{}^-$ aromatics.

DETAILED DESCRIPTION OF THE INVENTION

In accordance with the invention a large pore zeolite is treated with a soluble source of gallium. The large pore zeolite can be zeolite L, naturally occurring faujasite, synthetic zeolites X and Y and zeolite beta. These zeolites may be aluminosilicate(s), or aluminosilicates in which the aluminum is replaced in part or in whole by, e.g., boron. In the experiment reported below the zeolite was calcined prior to gallium treatment. Generally, zeolites are calcined at temperatures of 400° C. and above. The specific program used here involved calcination in $N_2$ to 538° C. at 1° C./min and at 538° C. for 8 hours and then in air at 538° C. for 4 hours.

The zeolite is treated with a soluble source of gallium. By way of example, readily available soluble sources of gallium include the nitrate and sulfate salts thereof. The exact water dilution factor of the soluble source of gallium is not critical. The gallium treatment of the large pore zeolite can result in incorporation of gallium into the zeolite framework in a position of tetrahedral substitution, or in exchange of gallium or in gallium impregnation of the zeolite. Preferably, the gallium is incorporated into the framework, because as an anionic framework element gallium has an increased aromatization activity than as a cation exchanged on the zeolite or as a deposite in the zeolite. The gallium treatment can be undertaken at temperatures ranging from ambient up to elevated temperatures, including heating under autogenous pressures to temperatures up to about 300° C.

The pH conditions of zeolite contact with the source of gallium will vary depending on the desired objectives.

When incorporation of gallium into the framework is to replace elements in the framework rather than to incorporate gallium into the framework of a zeolite depleted in framework elements, as by aluminum extraction, the following guidelines concerning the pH during zeolite contact with the soluble source of gallium may be helpful. When the zeolite contains boron and it is desired to substitute gallium atoms for boron atoms in the zeolite framework the pH of said contact will be 4 or less. When the zeolite contains aluminum as a framework element and it is desired to substitute gallium for said aluminum then the pH of gallium contact with the zeolite will be 10 or greater. The pH of that contact is not critical to incorporate gallium into a tetrahedral position which has been depleted by the anionic species Si, Al, B, Ge (for example, aluminum may have been removed from the zeolite framework by steaming previous to gallium contact).

After gallium treatment, the zeolite can be converted to the ammonium form by ammonium ion exchange. Aqueous solutions of ammonium cations are usually used to convert the zeolite to its ammonium form. Ammonium ion exchange can be undertaken at ambient temperature up to reflux temperatures more than one time; it also can be repeated at different temperatures. Prior to ammonium exchange the gallium treated zeolite may be washed free of reagents used in the gallium treatment step.

The source of the ammonium ion is not critical; thus the source can be an ammonium salt such as ammonium nitrate, ammonium sulfate, ammonium chloride, ammonium acetate and mixtures thereof. These reagents are usually in aqueous solutions; by way of illustration, aqueous solutions of 1 $NH_4NO_3$, 1 N $NH_4Cl$ and 1 N $NH_4Cl/NH_4OH$ have been used to effect ammonium ion exchange on these, and similar materials; the $NH_4OH$ may be used to keep the pH up and minimize hydronium ion exchange. The pH of the reaction mixture is generally maintained at 7 to 11, preferably at 8 to 10. Ammonium exchange may be conducted for a period of time ranging from about 0.5 to about 20 hours at a temperature ranging from ambient up to about 100° C. The ion exchange may be conducted in multiple stages.

After ammonium exchange, the ammonium exchanged zeolite can be treated to cause $NH_3$ evolution and conversion of the zeolite to its protonated form, sometimes referred to as its hydrogen form. This treatment can be simply a heat treatment at temperatures up to 800° C., preferrably up to 600° C. In the examples below, the ammonium form was treated in air at 1° C./min and maintained at 538° C. for 4 hours.

Gallium incorporation into the framework was confirmed by elemental analysis coupled with thermogravimetric analysis and NMR. Elemental analyses were undertaken by Galbraith Laboratories, Inc. Thermogravimetric analysis (TGA) following ammonium ion exchange of the gallium-zeolite indicated the presence of different ammonium groups from those in the zeolite free of gallium. The TGA was conducted by heating the sample 20° C./minute up to a temperature of about 700° C. All ammonium ion exchanged at sites provided by boron contained in the framework of a silicate zeolite will evolve, i.e., desorb, at temperatures below 300° C. The $NH_3$-$T_{max}$ had increased to 335°–360° C. from 180° C. for an ammoniated boron-containing "beta". The alpha value increased from 20 for the "beta" free of gallium to 77 for zeolite beta containing framework gallium. Together with the foregoing ammonium ion exchange data, the results of the elemental analysis indicates substitution of gallium in the crystallographic framework.

The similarities between Al and Ga solution NMR indicated Ga NMR was used to distinguish between octahedral and tetrahedral Ga and to determine the amount of Ga present. As with the Al NMR of these materials, similar Ga chemical shifts and line-widths were obtained for the single peak observed. The Ga chemical shifts for Ga-zeolite beta at 156 ppm, measured with respect to $[Ga(H_2O)_6]^{3+}$, compared to the solution results indicates the Ga is tetrahedrally coordinated. The Ga peaks of the zeolites are about 40 ppm upfield of the 190 ppm peak for the tetrahedral Ga species not coordinated to silicon in solution. This is consistent with the effect of Si coordination to Al where 4-coordinated Al with four Si neighbors, Al(4Si), is at 55 ppm compared to a 4-coordinated monomeric Al anion, $AlO_4^-$, at 80 ppm. This is evidence that Ga is not only tetrahedrally coordinated but is in the framework of the zeolite. Gallium-71 MAS NMR spectra were obtained on a 360 MHz and a 500 MHz spectrometer at the University of Illinois using 3–5 kHz spinning. The magic angle was set using the KBr technique. Pulse excitation (4.0 μs pulses, solution 90°=8.0 μs) was chosen to provide optimum signal. The pulse conditions did not fulfill Lippmaa's condition of $\phi^3$ is less than 1 to allow uniform excitation of all transitions. At a recycle time of 50 ms, from 87,712 to 144,000 scans were required for good signal/noise. No proton decoupling was used. Spectral signal/noise was enhanced with 500 Hz exponential line broadening. The chemical shifts are referenced to a 1M solution of $Ga(NO_3)_3$. The Si MAS NMR spectra were obtained on the 200 MHz NMR using 4.0 μs (60°) pulses, a 10.0 s recycle time, and proton decoupling.

Gallium incorporation into the zeolite, in accordance with the invention increases the paraffin cracking activity and the selectivity for aromatic product production. Increased cracking activity is measured by the alpha value test which is a measure of the hexane cracking activity or acidity of the zeolite.

The test for alpha value determination is further described in a letter to the editor, entitled "Superactive Crystalline Alumino-Silicate Hydrocarbon Cracking Catalyst", by P. B. Weisz and J. N. Miale, *Journal of Catalysis*, Vol. 4, pp. 527–529 (August 1965) and in U.S. Pat. No. 3,355,078. The entire contents of both are expressly incorporated by reference herein. A procedure for determining the alpha value was more recently described in the *Journal of Catalysis*, Vol. VI, page 278–287, 1966, which is incorporated by reference herein.

The selectivity of the zeolite of the invention to catalyze aromatic product (benzene) production is determined by the formula $$\frac{\text{weight percent benzene}}{100 - \text{weight percent of hexane output}}$$

The amount of benzene produced is determined by gas chromatography.

The resultant zeolite containing gallium may be combined with binders or matrix materials which increase its strength, and resistance to attrition and severe conditions of use. Silica, alumina, and silica-alumina are generally used as binders although various clays conventionally used for the purpose may act as the binder. The amount of catalyst can comprise 1 to 90% by weight based on the composition including binder and preferably 20 to 70% by weight based on said composition.

The catalyst of one composition may be used in hydrocarbon conversion processes. In such conversions, the LHSV of the feed ranges from 0.1 to 20; the temperature ranges from 700° F. to 1200° F.; the pressures range from subatmospheric to 1000 psig.

The catalyst of the invention may be used in aromatization processes with feedstocks containing aromatizable components in which the LHSV ranges from 0.3 to 100; the temperature ranges from 750° F. to 1200° F. and the pressure ranges from 0.01 atmospheres to 1000 psig.

EXAMPLES

EXAMPLE 1

A 10 g sample of zeolite Beta catalyst was calcined in $N_2$ to 538° C. at 1° C./min and was held at 538° C. for 8 hours. The calcination was then switched to air and was held for an additional 4 hours. The calcined material was refluxed in 0.2N NaOH solution with 2.5 g $Ga_2(SO_4)_3$ for 2 hours. The treated material was then washed and filtered. After ammonium exchange with $NH_4NO_3$ at reflux temperature and another subsequent room temperature exchange, the material was calcined in air at 1° C./min to 538° C. for 4 hours.

The result of the n-hexane cracking activity of the Ga modified zeolite Beta catalyst is listed in Table 1. For comparison, the result of the zeolite Beta catalyst with no gallium is included. The data show that the alpha of the Ga modified zeolite Beta catalyst increased from 386 to 511. Thus, the gallium containing catalyst of the invention exhibited higher hexane cracking activity than its gallium-free precursor. More importantly, the benzene selectivity increased from zero to 8%.

TABLE 1

Comparison of Cracking Activities and Benzene Selectivities of Ga-Zeolite Beta and Conventional Aluminosilicate Zeolite Beta

| Time on Stream (Min) | Alpha | Benzene Selectivity |
|---|---|---|
| Ga-Zeolite Beta | | |
| 5 | 511 | 7.0 |
| 10 | 216 | 8.0 |
| 15 | 138 | 8.0 |
| 20 | 98 | 9.0 |
| Aluminosilicate-Zeolite Beta (Precursor to Ga-Zeolite Beta) | | |
| 5 | 426 | 0.0 |
| 10 | 420 | 0.0 |
| 15 | 400 | 0.0 |
| 20 | 390 | 0.0 |
| 25 | 377 | 0.0 |
| 30 | 369 | 0.0 |

The as synthesized boron-zeolite beta used in the following examples contained 0.95 wt. % B, 0.54 wt. % $Al_2O_3$, 84.5 wt. % $SiO_2$, 10.2 wt. % C, 2.1 wt. % H, 1.5 wt. % N and 2000 ppm Na. The zeolite was calcined by heating in $N_2$ at 1° C./min to 538° C. then held in air at 538° C. for 2 hours. The calcined boron-zeolite beta was then exchanged with 1M $NH_4NO_3$ at pH and room temperature. The $SiO_2/Al_2O_3$ from TPD was 54:1 and had an alpha of 22.

EXAMPLE 2

1 g boron-zeolite beta was reacted with 0.4 g Ga($NO_3$)$_3$ at room temperature and pH=2. The sample was then air calcined at 538° C. for 2 hours. Elemental analysis showed the product contained 0.01 wt. % B, 0.38 wt. % $Al_2O_3$, and 1.37 wt. % Ga. The alpha increased to 55 with 8-10% benzene selectivity. The exchange capacity by $NH_3$-TPD was 0.2670 meq/g ash which agrees with the value by elemental analysis, 0.2765 meq/g ash. The $NH_3$-TPD Tmax increased from 180° to 334° C. The results show that Ga has been substituted into the zeolite beta framework.

EXAMPLE 3

Boron-zeolite beta was extracted with $H_4$EDTA in D.I. $H_2O$ room temperature for 1 hour. The product contained 0.001 ppm B and 0.43 wt. % $Al_2O_3$ and had an alpha of 13.5. 1 g of this acid treated boron-zeolite beta was reacted with 0.19 g Ga($NO_3$)$_3$ at room temperature. The product contained 1.04 wt. % Ga and had an alpha of 77 with 13-14% benzene selectivity.

EXAMPLE 4

Boron-zeolite beta was extracted sequentially with 0.1M and 1.0M $HNO_3$ at room temperature. The product contained 0.001 ppm boron and 0.36 wt. % $Al_2O_3$ and had an alpha of 15. 1 g of this acid treated boron-zeolite beta was reacted with 0.25 g Ga($NO_3$)$_3$ at room temperature. The product contained 1.38 wt. % Ga and had an alpha of 82 with 8-10% benzene selectivity.

In accordance with the invention, there is a zeolitic gallium-silicate which contains 18.7 to 46.2 weight percent silicon (40 to 90 weight percent silica), based on $SiO_2$; 0.1 to 10 weight percent gallium (0.13 to 13.4 weight percent gallium oxide based on $Ga_2O_3$), and 0 to 10 weight percent alumina; and 0 to 10 weight percent boron (0 to 32.2 weight percent boron), based on $B_2O_3$.

What is claimed is:

1. A process for incorporating gallium into a zeolite free of gallium, the pore sizes of which are greater than about 7 Angstroms, comprising in combination
    depleting said zeolite in framework elements wherein aluminum is an element in said framework;
    contacting said zeolite free of gallium with an aqueous solution of a source of water soluble gallium, at a pH of at least about 10, at temperatures ranging from ambient to 300° C. to increase the gallium content of said zeolite; and
    subjecting the zeolite of increased gallium content to conditions effective to convert it to its protonated form to render it effective to crack hexane and whereby it exhibits selectivity for benzene production under conditions effective to crack hexane.

2. A process for incorporating gallium into a zeolite, the pore sizes of which are greater than about 7 Angstroms, having a composition, after said incorporation, consisting of
    0.1 to 10 weight percent gallium,
    greater than 0 and up to 10 weight percent alumina,
    0 to 10 weight percent boron, and the remainder being $SiO_2$
    wherein the process comprises
    contacting said zeolite containing framework alumina with a source of soluble gallium at temperatures ranging from ambient to 300° C. at a pH of at least about 10 to increase the gallium content of said zeolite,
    subjecting the zeolite of increased gallium content to conditions effective to convert the crystalline material to its protonated form to render it effective to crack hexane.

3. The process of claim 2, wherein the zeolite is zeolite beta.

4. The process of claim 2, which includes recovering zeolite beta having said composition, which exhibits an alpha value greater than said zeolite free of gallium and which exhibits, under conditions to determine said alpha value, selectivity for benzene production which is absent in said zeolite free of gallium.

5. The process of claim 4, wherein aluminum is a framework element which is replaced during said contacting.

* * * * *